(12) United States Patent
Ehinger et al.

(10) Patent No.: US 10,378,978 B2
(45) Date of Patent: *Aug. 13, 2019

(54) METHOD AND SYSTEM FOR MEASURING TORQUE IN A TILTROTOR AIRCRAFT

(71) Applicant: Bell Helicopter Textron Inc., Fort Worth, TX (US)

(72) Inventors: Ryan T. Ehinger, Southlake, TX (US); David R. Bockmiller, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 112 days.

This patent is subject to a terminal disclaimer.

(21) Appl. No.: 15/807,958

(22) Filed: Nov. 9, 2017

(65) Prior Publication Data

US 2018/0067006 A1    Mar. 8, 2018

Related U.S. Application Data

(63) Continuation of application No. 14/526,621, filed on Oct. 29, 2014, now Pat. No. 9,841,333.

(51) Int. Cl.
| | |
|---|---|
| *G01L 3/02* | (2006.01) |
| *B64C 27/57* | (2006.01) |
| *B64C 27/32* | (2006.01) |
| *G01L 3/10* | (2006.01) |
| *B64F 5/60* | (2017.01) |

(Continued)

(52) U.S. Cl.
CPC ............... *G01L 3/02* (2013.01); *B64C 27/32* (2013.01); *B64D 35/00* (2013.01); *B64F 5/60* (2017.01); *G01L 3/101* (2013.01); *B64C 29/0033* (2013.01)

(58) Field of Classification Search
CPC ... G01L 3/02; G01L 3/101; G01L 3/04; G01L 3/10; G01L 23/003; B64F 5/60; B64F 5/0023; B64F 5/0045; B64C 27/32; B64C 27/57; B64C 29/0033; B64D 35/00; F05D 2260/80
See application file for complete search history.

(56) References Cited

U.S. PATENT DOCUMENTS

| | | | |
|---|---|---|---|
| 3,538,762 A | * | 11/1970 | Parkinson ............... G01L 3/101 73/862.328 |
| 3,824,848 A | | 7/1974 | Parkinson |
| 4,602,515 A | | 7/1986 | Eichenlaub |

(Continued)

OTHER PUBLICATIONS

Office Action, dated Jan. 27, 2017, by the USPTO, U.S. Appl. No. 14/526,621.

(Continued)

*Primary Examiner* — Justin D Seabe
*Assistant Examiner* — Joshua R Beebe
(74) *Attorney, Agent, or Firm* — Timmer Law Group, PLLC

(57) ABSTRACT

A method for calculating torque through a rotor mast of a propulsion system of a tiltrotor aircraft includes receiving the torque being applied through a quill shaft of the rotorcraft. The quill shaft is located between a fixed gearbox and a spindle gearbox, and the spindle gearbox is rotatable about a conversion access. The torque through the rotor mast is determined by using the torque through the quill shaft and the efficiency loss value between the quill shaft and the rotor mast.

11 Claims, 16 Drawing Sheets

(51) Int. Cl.
*B64D 35/00* (2006.01)
*B64C 29/00* (2006.01)

(56) References Cited

U.S. PATENT DOCUMENTS

| | | | |
|---|---|---|---|
| 4,896,544 A | | 1/1990 | Garshelis |
| 5,456,123 A | * | 10/1995 | Parkinson ............... G01L 3/101 |
| | | | 73/1.09 |
| 8,132,474 B2 | | 3/2012 | Jackson |
| 8,602,347 B2 | * | 12/2013 | Isaac ................... B64C 29/0033 |
| | | | 244/23 B |
| 9,841,333 B2 | | 12/2017 | Ehinger |
| 2004/0050179 A1 | | 3/2004 | Kilmartin et al. |
| 2015/0048214 A1 | | 2/2015 | Bockmiller et al. |
| 2016/0122039 A1 | | 5/2016 | Ehinger et al. |

OTHER PUBLICATIONS

Applicant-Initiated Interview Summary, dated May 1, 2017, by the USPTO, U.S. Appl. No. 14/526,621.
Final Office Action, dated Jun. 29, 2017, by the USPTO, U.S. Appl. No. 14/526,621.
Notice of Allowance, dated Sep. 14, 2017, by the USPTO, U.S. Appl. No. 14/526,621.

* cited by examiner

METHOD AND SYSTEM FOR MEASURING TORQUE IN A TILTROTOR AIRCRAFT

CROSS-REFERENCE TO RELATED APPLICATIONS

This application claims priority to and is a continuation patent application of U.S. patent application Ser. No. 14/526,621, filed Oct. 29, 2014, which is hereby incorporated by reference for all purposes as if fully set forth herein.

BACKGROUND

Technical Field

The present disclosure relates to measuring torque in a tiltrotor aircraft. The present disclosure also relates to a fixed engine and rotating proprotor arrangement for a tiltrotor aircraft.

Description of Related Art

There are several different methods of measuring the torque in a tiltrotor aircraft. A conventional method of measuring torque in a tiltrotor aircraft is to apply sensors on the mast itself or on the engine output shaft of the tiltrotor aircraft. However, both of these conventional methods have significant shortcomings. Therefore, there is a need for an alternative location to place a torque measuring system.

DESCRIPTION OF THE DRAWINGS

The novel features believed characteristic of the method and apparatus of the present disclosure are set forth in the appended claims. However, the method and apparatus itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the method and apparatus of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
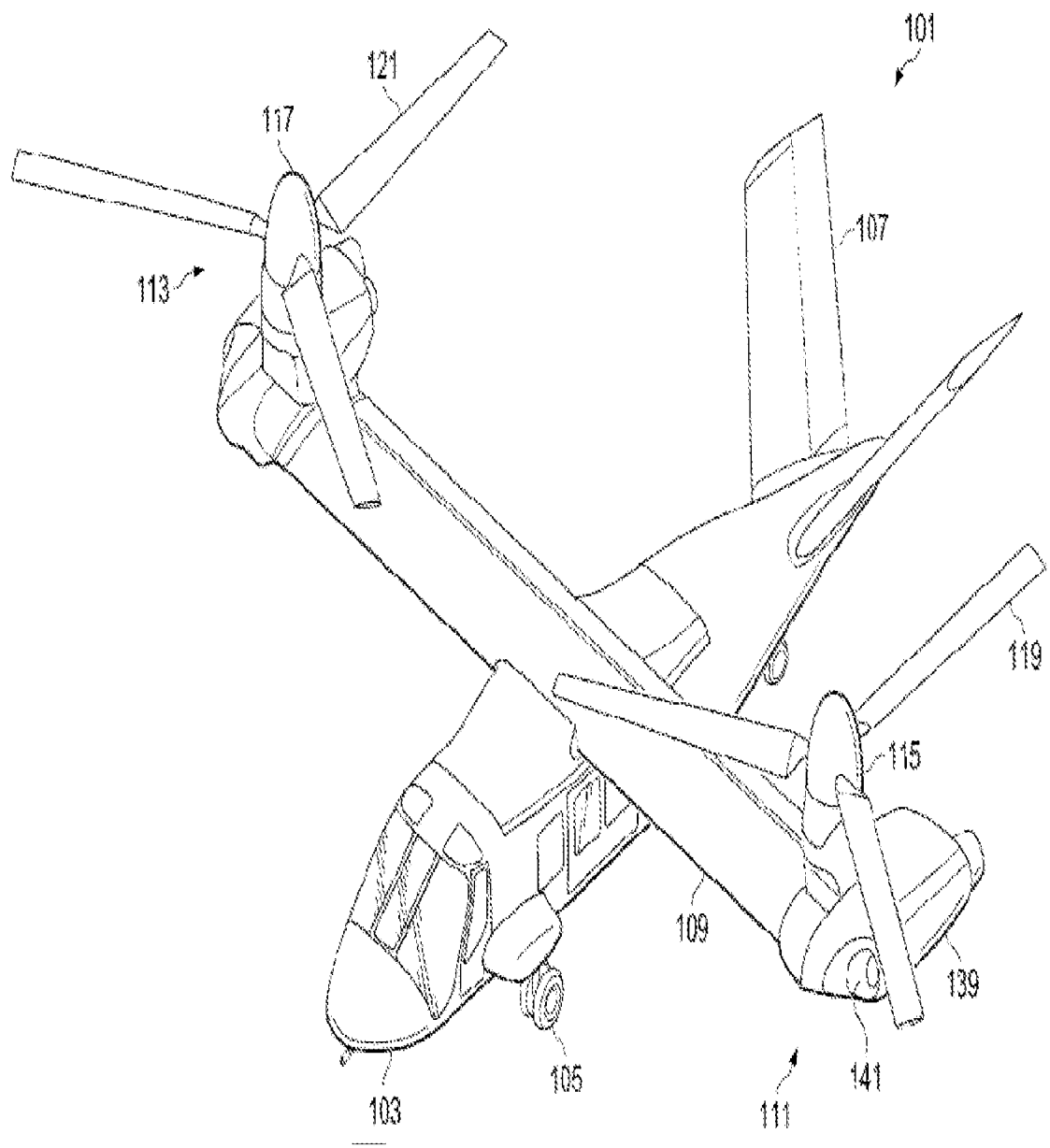
FIG. 1 is a perspective view of a tiltrotor aircraft in helicopter mode, according to one example embodiment.
Figure 2:
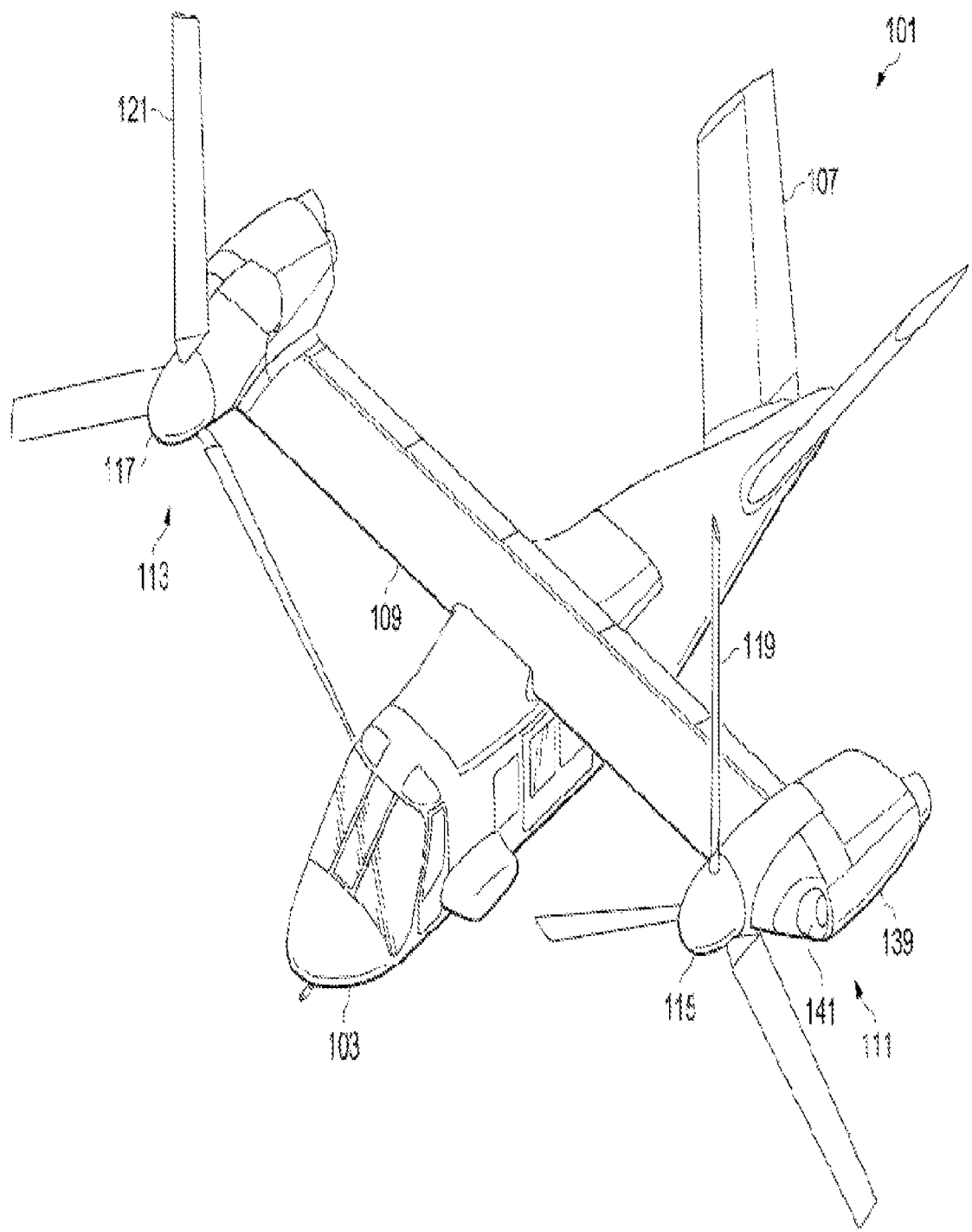
FIG. 2 is a perspective view of a tiltrotor aircraft in airplane mode, according to one example embodiment.
Figure 3:
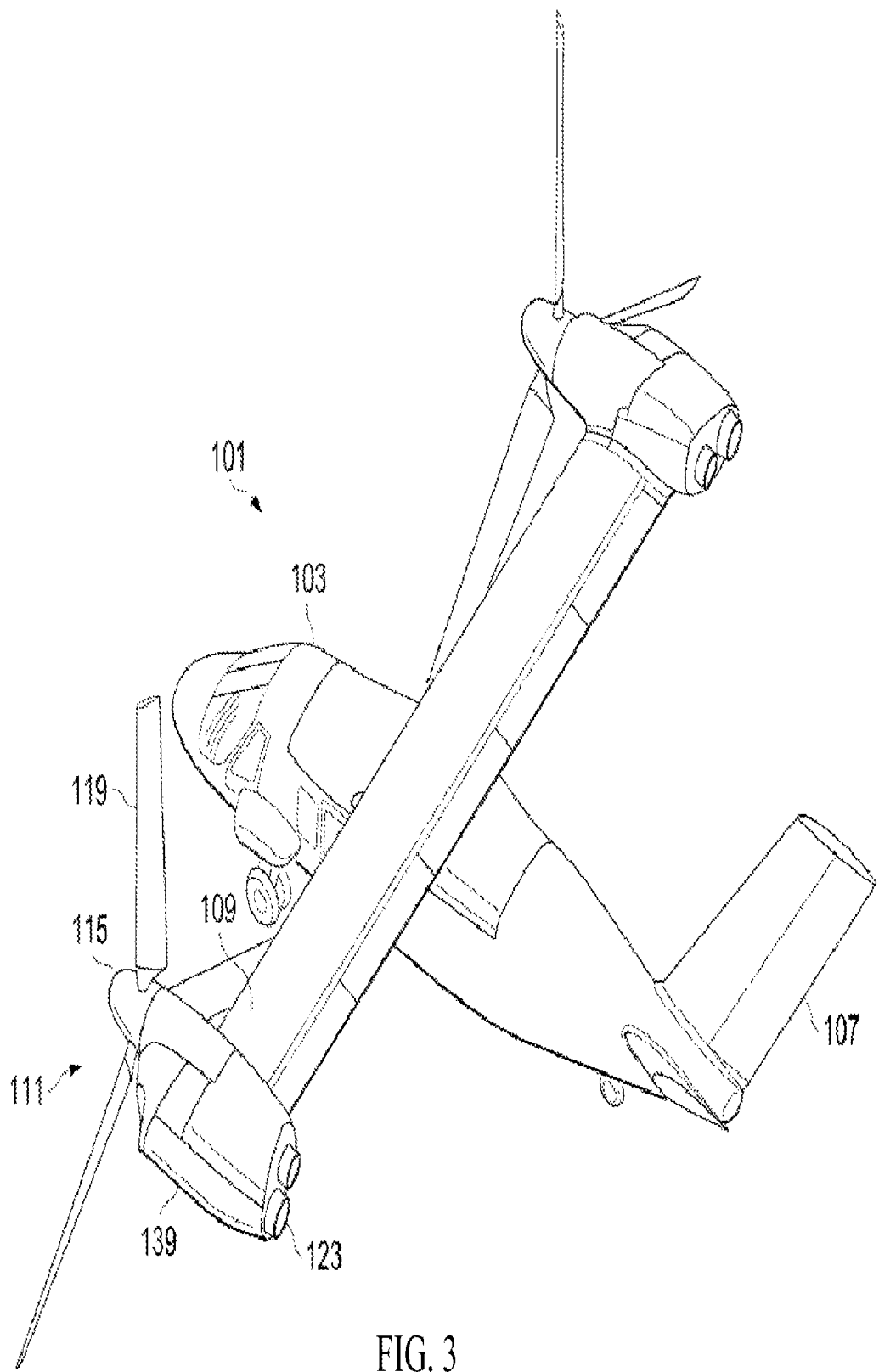
FIG. 3 is a perspective view of a tiltrotor aircraft in airplane mode, according to one example embodiment.
Figure 4:
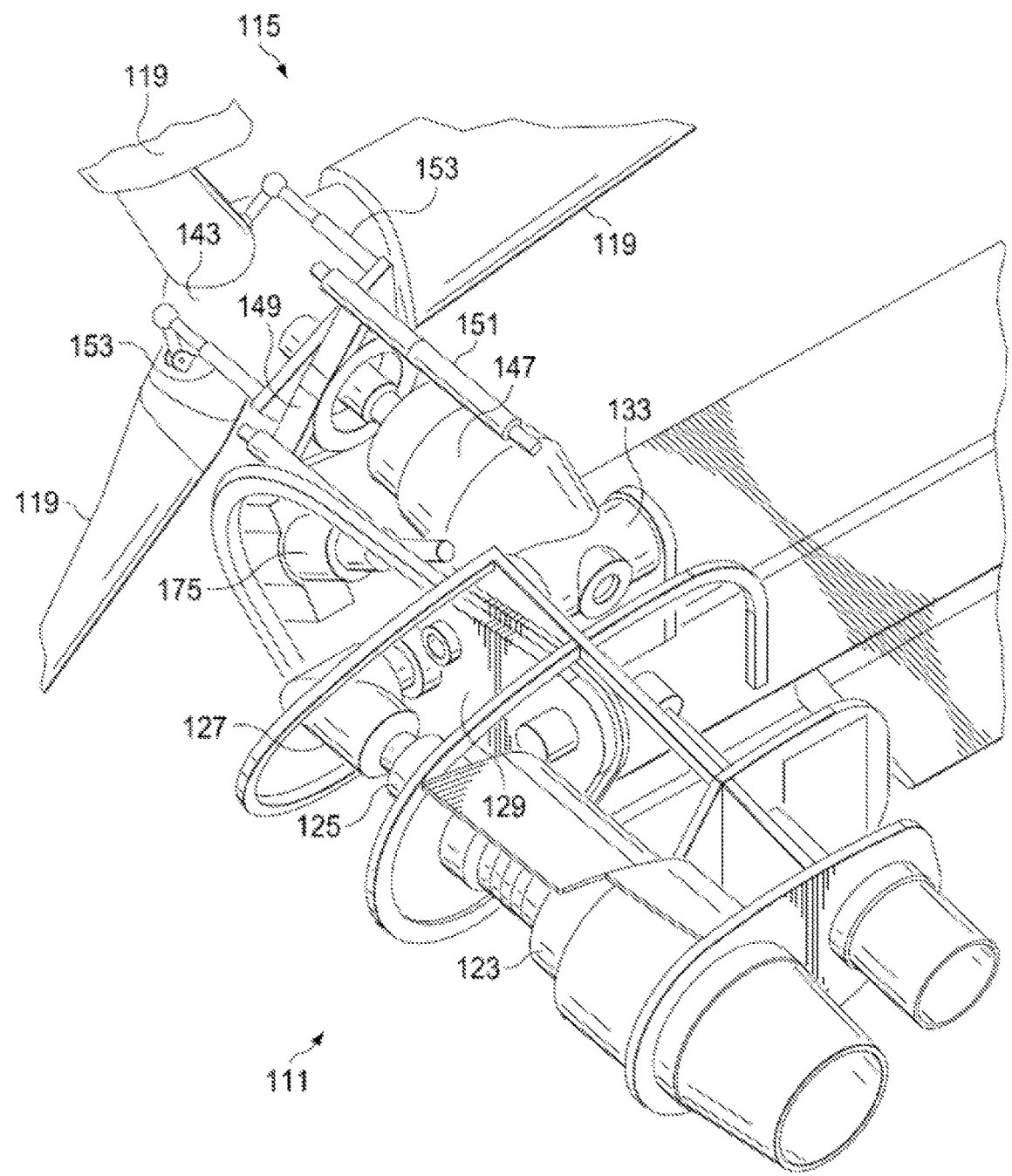
FIG. 4 is a partial perspective view of a propulsion system portion of the tiltrotor aircraft, according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111 and 113 includes a fixed engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode, in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The propulsion system 113 is substantially symmetric to the propulsion system 111; therefore, for sake of efficiency certain features will be disclosed only with regard to propulsion system 111. However, one of ordinary skill in the art would fully appreciate an understanding of propulsion system 113 based upon the disclosure herein of propulsion system 111.

Further, propulsion systems 111 and 113 are illustrated in the context of tiltrotor aircraft 101; however, propulsion systems 111 and 113 can be implemented on other tiltrotor aircraft. For example, an alternative embodiment may include a quad tiltrotor that has an additional wing member aft of wing 109, the additional wing member can have additional propulsion systems similar to propulsion systems 111 and 113. In another embodiment, propulsion systems 111 and 113 can be used with an unmanned version of tiltrotor aircraft 101. Further, propulsion systems 111 and 113 can be integrated into a variety of tiltrotor aircraft configurations.

Referring now also to FIGS. 3-11, propulsion system 111 is disclosed in further detail. Propulsion system 111 includes an engine 123 that is fixed relative to wing 109. An engine output shaft 125 transfers power from engine 123 to a spiral bevel gearbox 127 that includes spiral bevel gears to change torque direction by 90 degrees from engine 123 to a fixed gearbox 129 via a clutch. Fixed gearbox 129 includes a plurality of gears, such as helical gears, in a gear train that are coupled to an interconnect drive shaft 131, and a quill shaft 203. Torque is transferred to an input 167 in spindle gearbox 133 of proprotor gearbox 147 through the quill shaft 203.

Figure 8:
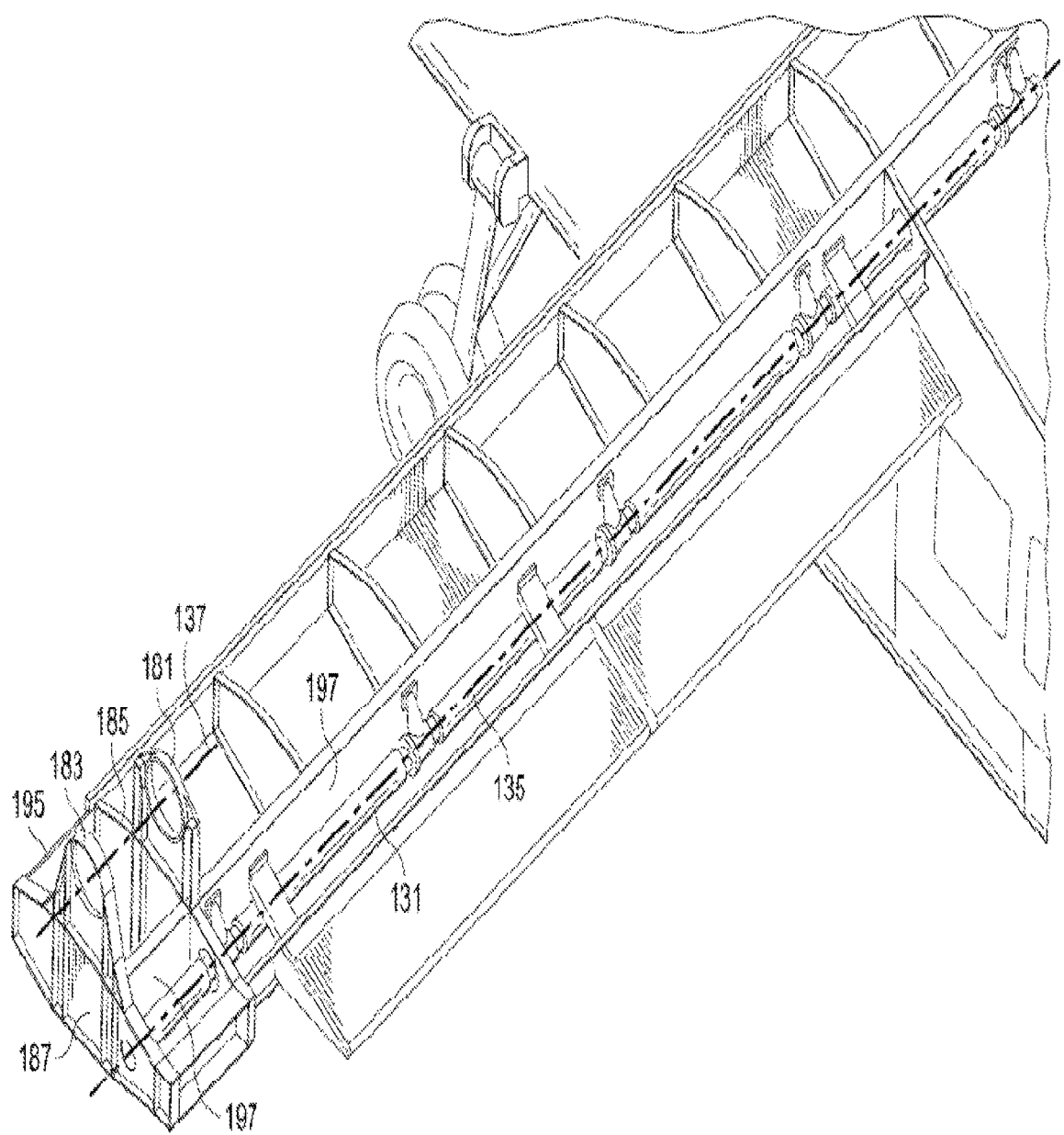
FIG. 8 is a partial perspective view of the tiltrotor aircraft, according to one example embodiment.
Figure 9:
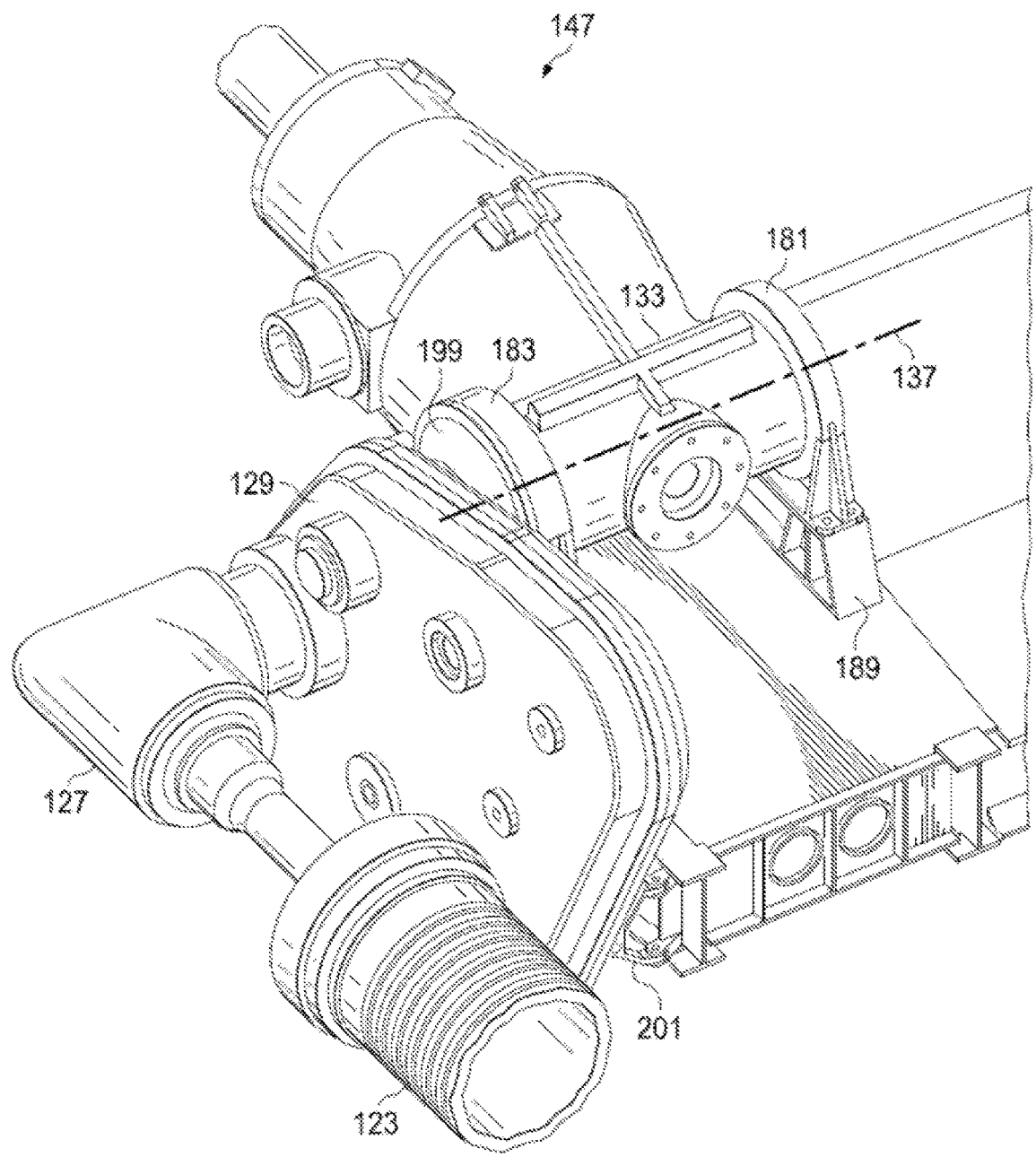
FIG. 9 is a partial perspective view of the tiltrotor aircraft, according to one example embodiment.
Figure 10:
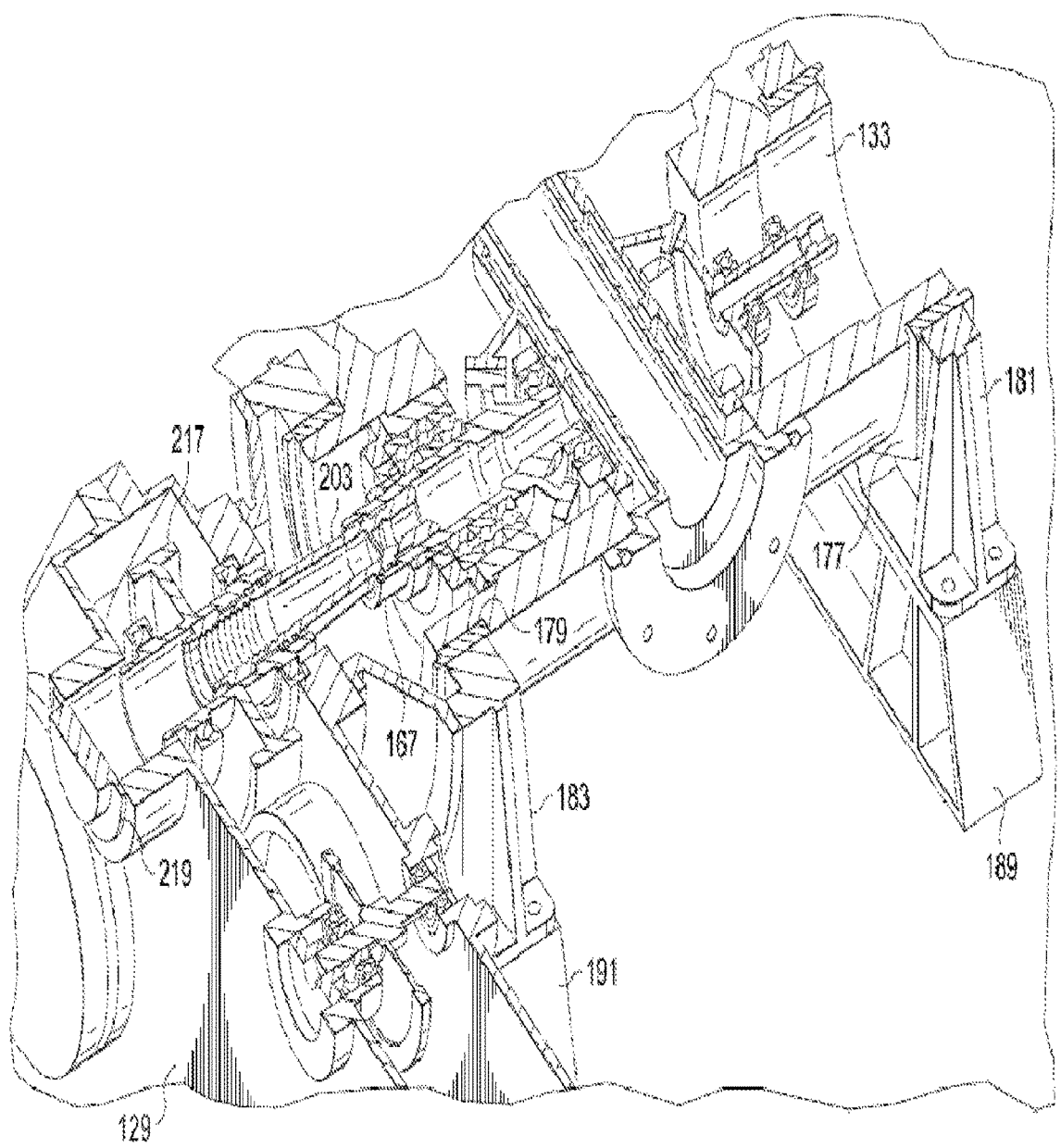
FIG. 10 is a cross-sectional view of the propulsion system, according to one example embodiment.
Figure 11:
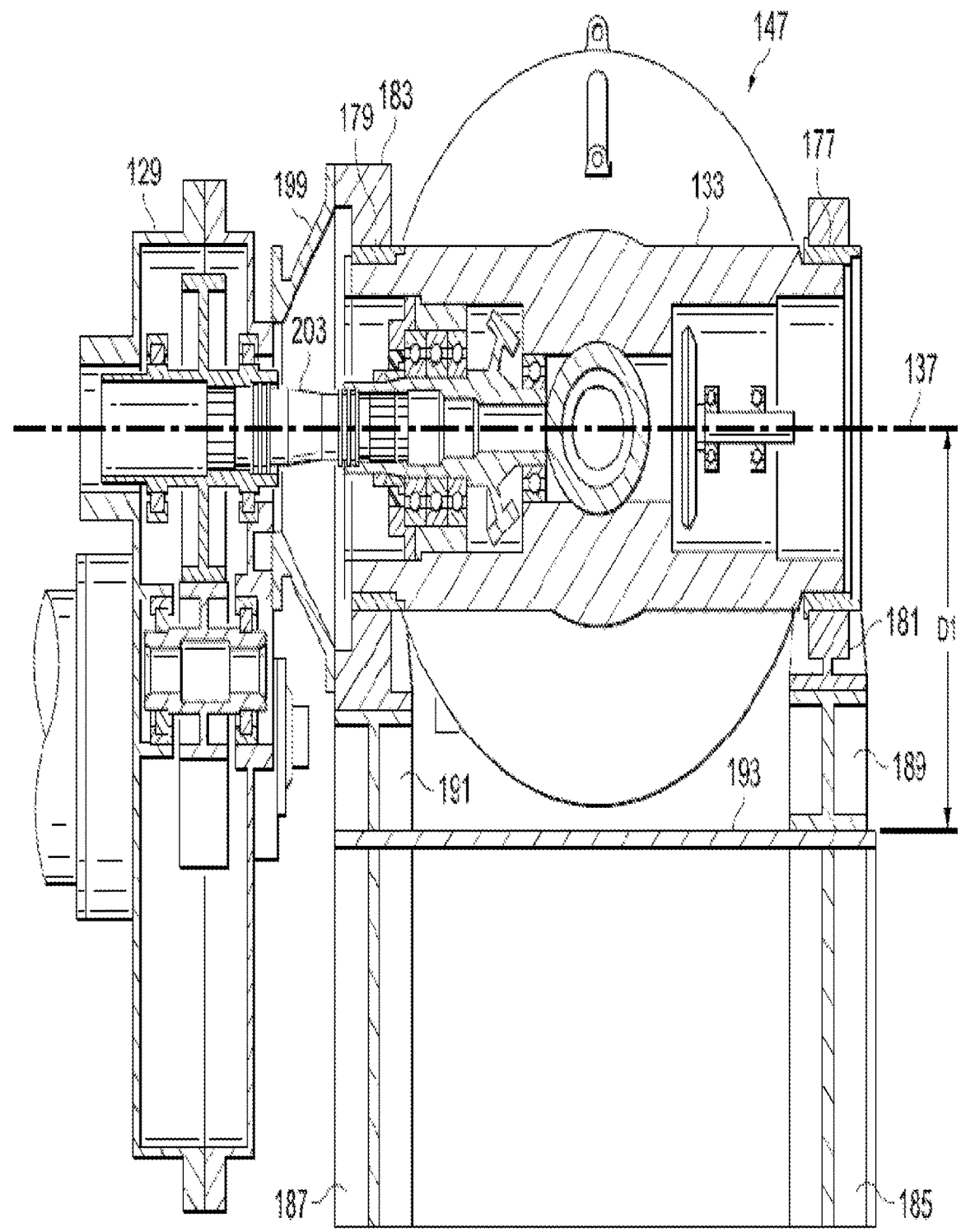
FIG. 11 is a cross-sectional view of the propulsion system, according to one example embodiment.

The interconnect drive shaft 131 provides a torque path that enables a single engine to provide torque to both proprotors 111 and 113 in the event of a failure of the other engine. In the illustrated embodiment, interconnect drive shaft 131 has a rotational axis 135 that is vertically lower and horizontally aft of the conversion axis 137 of the spindle gearbox 133. Conversion axis 137 is parallel to a lengthwise axis 225 of wing 109. Referring in particular to FIG. 8, interconnect drive shaft 131 includes a plurality of segments that share a common rotational axis 135. Location of interconnect drive shaft 131 aft of the aft wing spar 197 provides for optimal integration with fixed gearbox 129 without interfering with the primary torque transfer in the quill shaft 203 between fixed gearbox 129 and spindle gearbox 133; as such, the conversion axis 137 of spindle gearbox 133 is parallel to the rotational axis 135 and interconnect drive shaft 131, but located forward and above rotational axis 135.

Engine 123 can be housed and supported in an engine nacelle 139. Engine nacelle 139 can include an inlet 141, aerodynamic fairings, and exhaust, as well as other structures and systems to support and facilitate the operation of engine 123.

The proprotor 115 of propulsion system 111 can include a plurality of rotor blades 119 coupled to a yoke 143. The yoke 143 can be coupled to a mast 145. Mast 145 is coupled to a proprotor gearbox 147. It should be appreciated that proprotor 115 can include other components, such as a swashplate 149 that is selectively actuated by a plurality of actuators 151 to selectively control the pitch of rotor blades 119 via pitch links 153.

Figure 5:
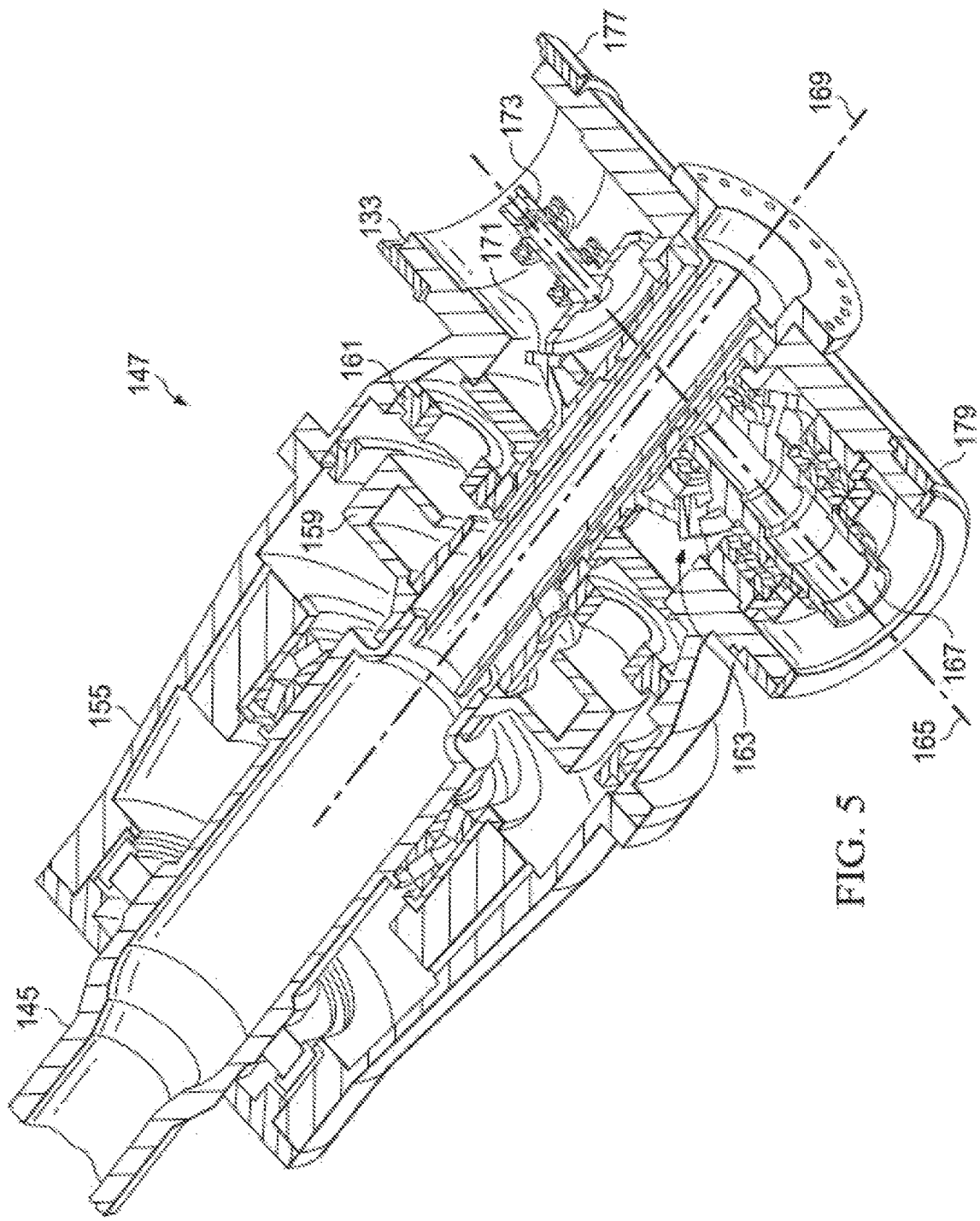
FIG. 5 is a cross-sectional view of a proprotor of the propulsion system, according to one example embodiment.
Figure 6:
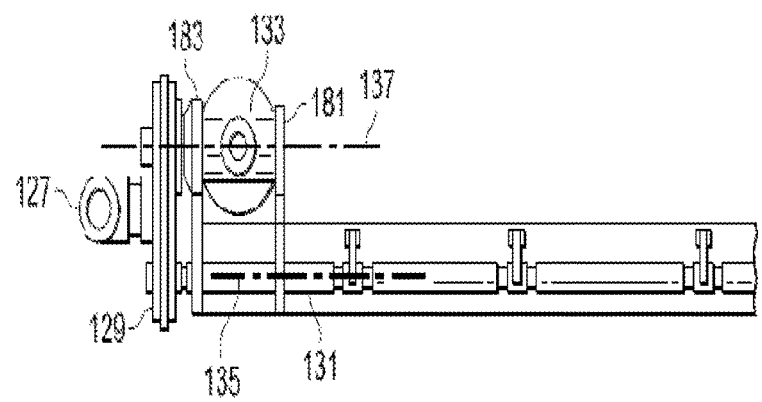
FIG. 6 is a partial perspective view of a propulsion system portion of the tiltrotor aircraft, according to one example embodiment.
Figure 7:
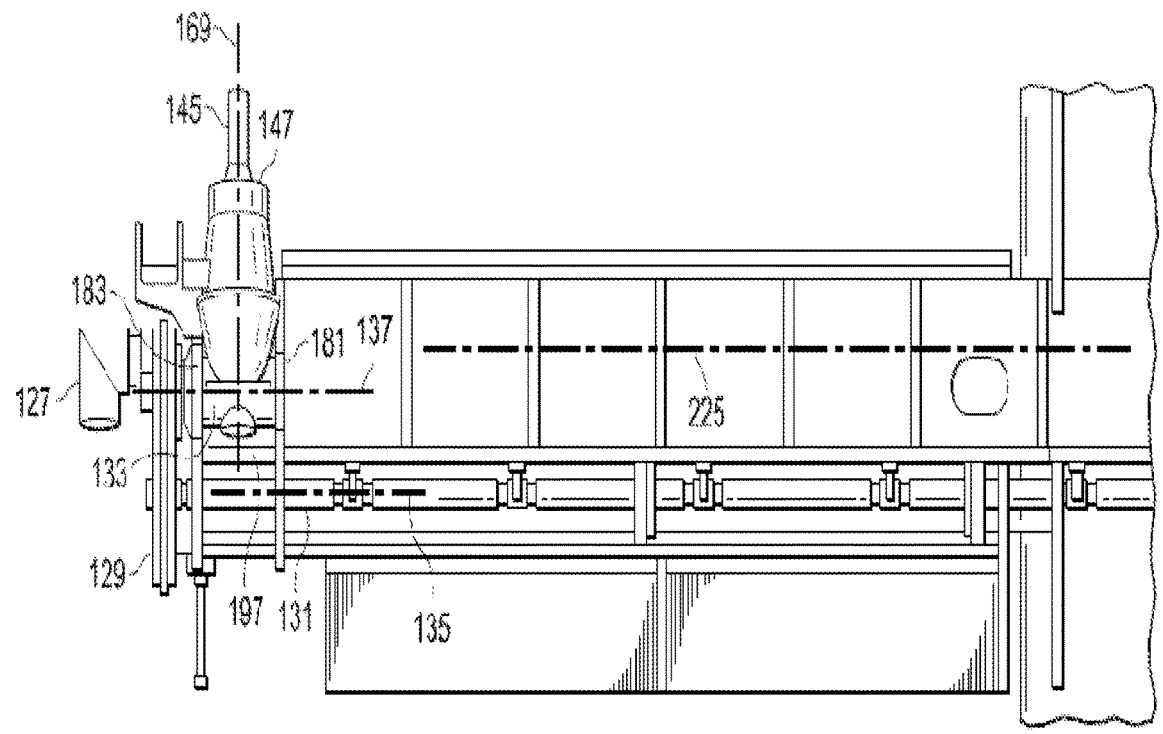
FIG. 7 is a partial top view of the tiltrotor aircraft, according to one example embodiment.

Proprotor gearbox 147 is configured to transfer power and reduce speed to mast 145. Further, proprotor gearbox 147 provides operational support of proprotor 115. Referring in particular to FIG. 5, proprotor gearbox 147 can include a top case 155 portion and spindle gearbox 133. Speed reduction is accomplished by a low speed planetary gear assembly 159 and a high speed planetary gear assembly 161. A spiral bevel gear assembly 163 includes a spiral bevel gear input 167 and a spiral bevel gear output 171. Spiral bevel gear assembly 163 changes power direction from along a centerline axis 165 of spiral bevel gear input 167 to a centerline axis 169 of spiral bevel gear output 171. An accessory drive 173 can be coupled to spiral bevel gear output 171. It should be appreciated that proprotor gearbox 147 can include any bearings, lubrication systems, and other gearbox related components that may be beneficial for operation.

During operation, a conversion actuator 175 (shown at least in FIG. 4) can be actuated so as to selectively rotate proprotor gearbox 147 about a conversion axis 137 that corresponds with axis 165, which in turn selectively positions proprotor 115 between helicopter mode (shown in FIG. 1) and airplane mode (shown in FIG. 2). The operational loads, such as thrust loads, are transmitted through rotor mast 145 and into the spindle gearbox 133 of proprotor gearbox 147, and thus the structural support of spindle gearbox 133 is critical.

In the illustrated embodiment, the spindle gearbox 133 of proprotor gearbox 147 is mounted to an inboard pillow block 181 with an inboard bearing assembly 177. Similarly, spindle gearbox 133 of proprotor gearbox 147 is mounted to an outboard pillow block 183 with an outboard bearing assembly 179. Thus, spindle gearbox 133 is structurally supported but rotatable about conversion axis 137 by conversion actuator 175. Inboard pillow block 181 is structurally coupled to an inboard rib 185. Similarly, outboard pillow block 183 is structurally coupled to an outboard rib 187. In one embodiment, an inboard intermediate support 189 is utilized as a structural element between inboard pillow block 181 and inboard rib 185, and an outboard intermediate support 191 is similarly utilized as a structural element between outboard pillow block 183 and outboard rib 187. It should be appreciated that the exact structural configuration is implementation specific, and that structural components can be combined and/or separated to meet implementation specific requirements.

Spindle gearbox 133 of proprotor gearbox 147 is located above a surface of an upper wing skin 193 at a distance D1 (shown in FIG. 11), while also being approximately centered between inboard rib 185 and outboard rib 187. One advantage of locating the proprotor gearbox 147 above the surface of upper wing skin 193 is that the fore/aft location of proprotor gearbox 147 can be easily tailored to align the aircraft center of gravity (CG) with the conversion axis 137 while the propulsion system 111 is in helicopter mode, while also aligning the aircraft center of gravity (CG) with the wing aerodynamic center of lift while the propulsion system 111 is in airplane mode. Because the aircraft center of gravity (CG) shifts as the proprotor 115 rotates between helicopter mode and airplane mode, the distance from the location of proprotor 115 in helicopter mode and airplane mode center of lift must correspond. As such, locating proprotor gearbox 147 above the wing allows the exact fore/aft location to be optimized accordingly, while also structurally attaching the proprotor gearbox 147 with in a zone of the torque box formed by forward wing spar 195, aft wing spar 197, inboard rib 185, and outboard rib 187.

The location of the spindle gearbox 133 portion of proprotor gearbox 147 provides an efficient structural support for enduring operational loads by being mounted to inboard rib 185 and outboard rib 187, which together with a forward wing spar 195 and an aft wing spar 197, form a structural torque box. For example, when aircraft 101 is in helicopter mode, torque about mast axis 169 is reacted by the torque box collectively formed by inboard rib 185, outboard rib 187, forward wing spar 195, and aft wing spar 197. It should be noted that location of spindle gearbox 133 of proprotor gearbox 147 also positions the mast axis 169, while in helicopter mode, inboard of outboard rib 187, outboard of inboard rib 185, forward of aft spar 197, and aft of forward spar 195, which allows the axis of the torque to be inside of the torque box structure, rather than cantilevered outside of the torque box structure. In contrast, a spindle gearbox location outside (such as outboard, forward, or aft) would cause a moment that would increase operational loading, thus requiring heavier and less efficient structural support.

Fixed gearbox 129 is secured to outboard pillow block 183 with a housing 199. Housing 199 is a conical structure with one or more flanges configured for coupling to gearbox 129 and outboard pillow block 183. An additional support may be utilized to provide additional support between gearbox 129 and the wing structure, such as supplemental support 201 (shown in FIG. 9); however, housing 199 is the primary support structure therebetween. In one embodiment, supplemental support 201 is strong in the inboard/outboard and vertical directions, but weak in the fore/aft direction. Housing 199 is significant because it is configured to minimize misalignment between fixed gearbox 129 and spindle gearbox 133. If the primary attachment structure was not common with the attachment structure of proprotor gearbox 147, then operation loading, such as load deflection and/or thermal growth, would dramatically increase the misalignment therebetween.

Power is transferred from fixed gearbox 129 to spindle gearbox 133 of proprotor gearbox 147 through the quill shaft 203. Quill shaft 203 is a floating shaft configured to accept any misalignment due to manufacturing tolerances and operational effects between the fixed system (fixed gearbox 129) and the rotating system (proprotor gearbox 147). Quill shaft 203 is configured to be assembled and disassembled independently from the fixed and rotating systems. As such, quill shaft 203 can be removed without removing either of the fixed and rotating systems.

Figure 12:
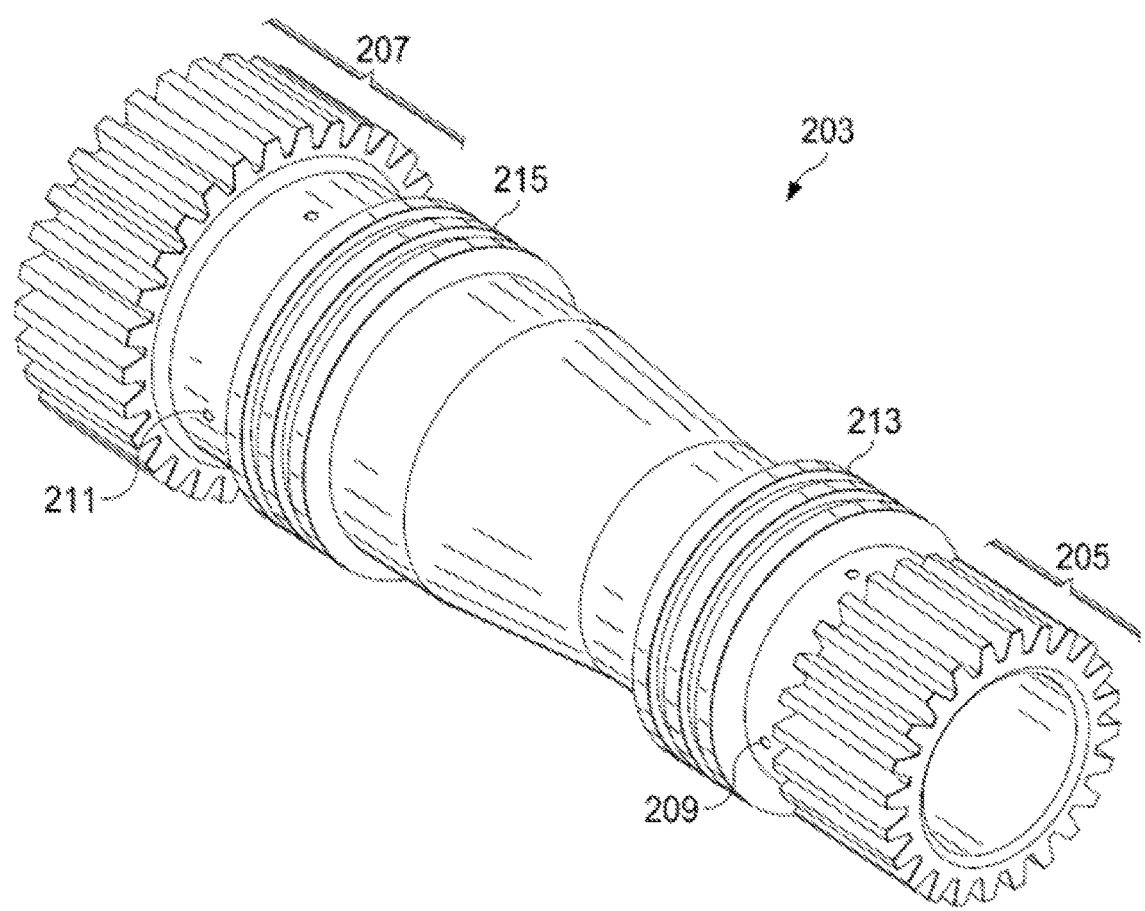
FIG. 12 is a perspective view of a quill shaft, according to one example embodiment.
Figure 13:
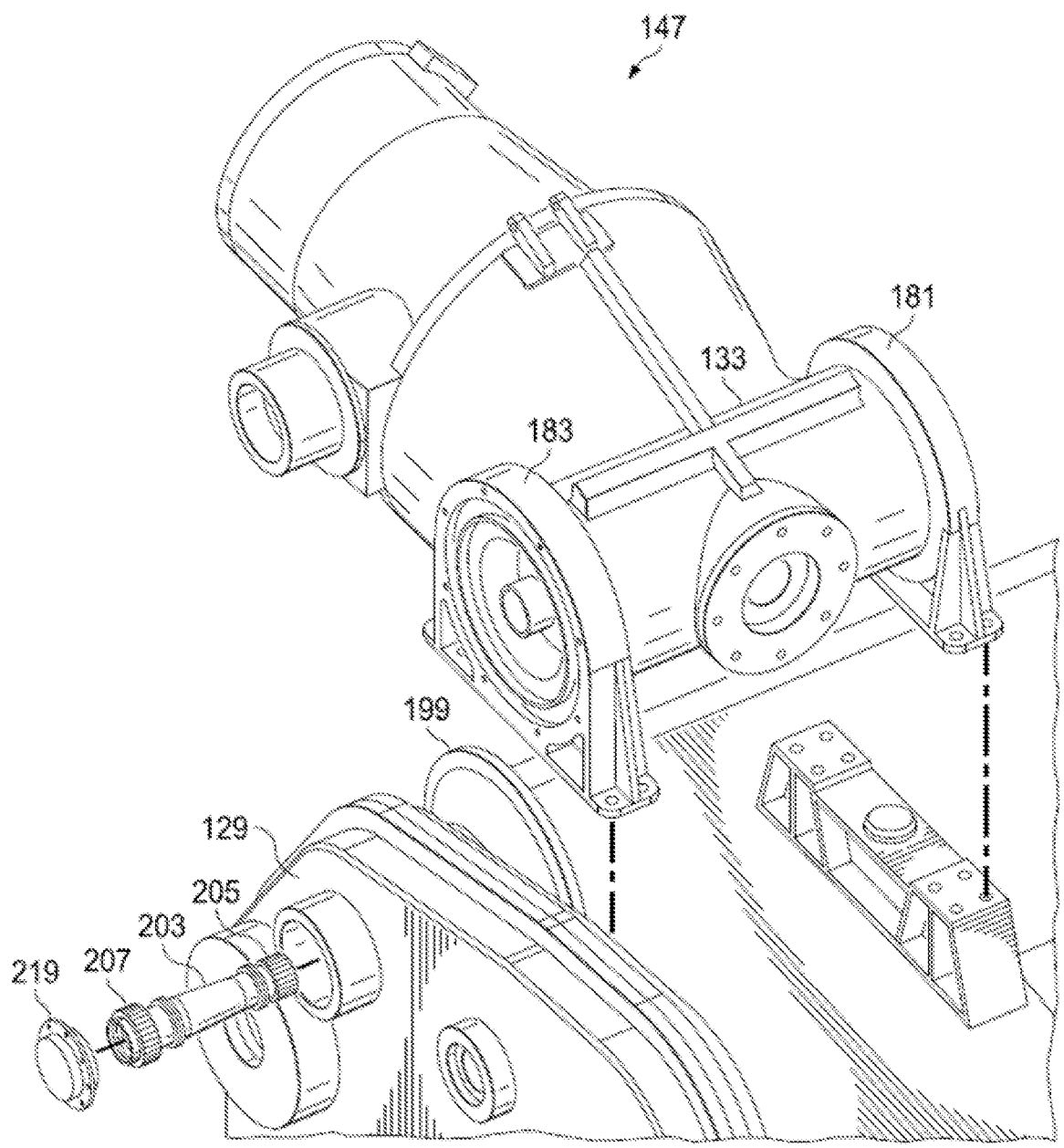
FIG. 13 is a perspective view of the propulsion system in a partially disassembled state, according to one example embodiment.
Figure 14:
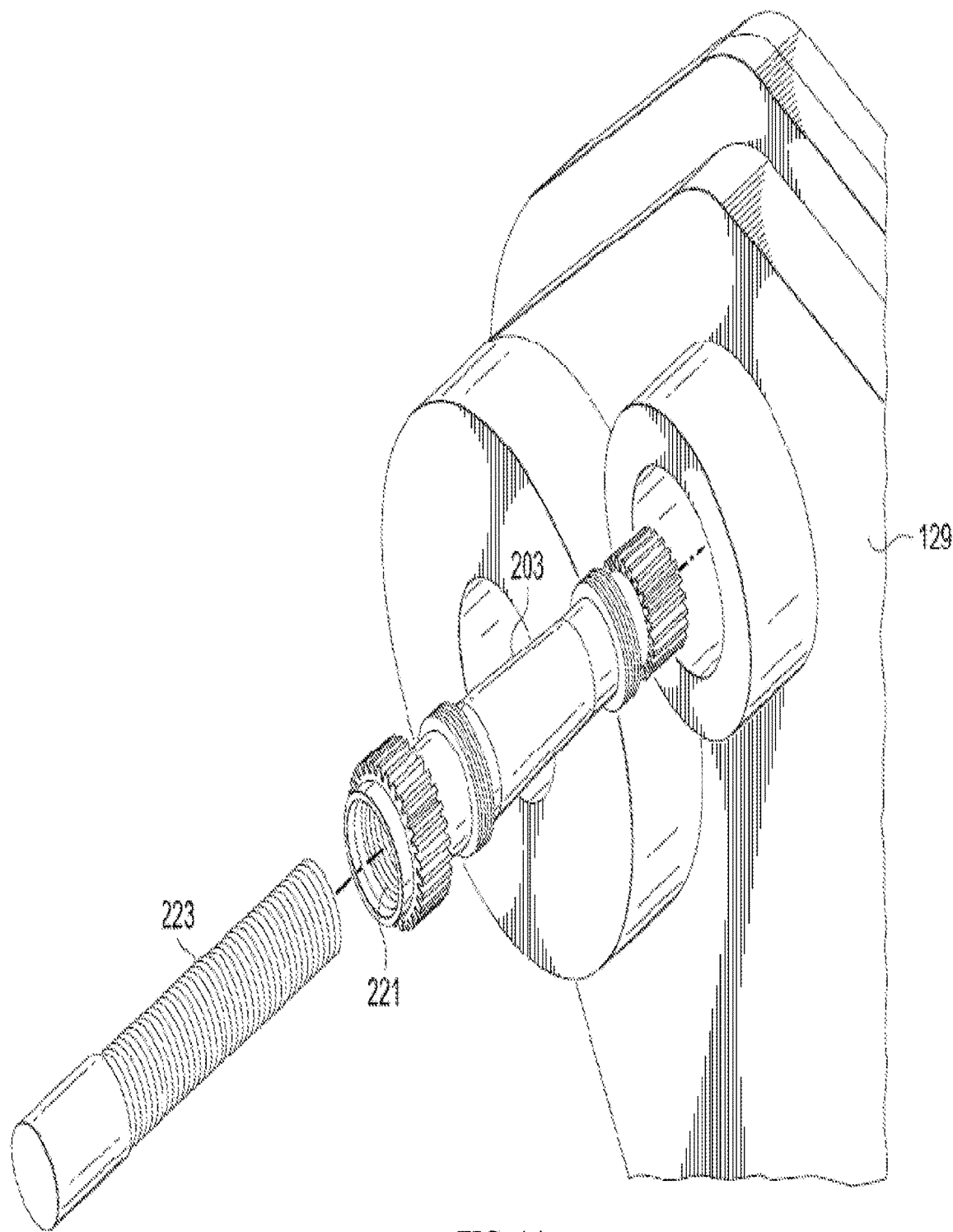
FIG. 14 is a perspective view of the propulsion system in a partially disassembled state, according to one example embodiment.

Referring also to FIGS. 12-14, quill shaft 203 can have a first splined portion 205 and a second splined portion 207. In the illustrated embodiment, the first splined portion 205 has a smaller diameter than the second splined portion 207, thus the first splined portion 205 is located inboard and the second splined portion 207 is located outboard so that the quill shaft 203 can be removed to the outboard direction for inspection/maintenance thereof. Quill shaft 203 can include one or more inboard lubrication ports 209 and outboard lubrication ports 211. Quill shaft 203 can also include a first sect of o-ring glands 213 and a second set of o-ring glands 215.

During operation, second splined portion 207 is in torque engagement with an output gear 217 of fixed gearbox 129 while first splined portion 205 is in torque engagement with a splined portion of the input 167 to spindle gearbox 133. The first splined portion 205 and second splined portion 207 are crowned to promote teeth engagement in the event of non-axial misalignment between spindle gearbox 133 and fixed gearbox 129. Lubrication oil is circulated to the mating surfaces of the first splined portion 205 through outboard lubrication ports 211, the seals associated with the second set of o-ring glands forcing the lubrication fluid to flow to the first splined portion 205 instead of flowing toward the center of quill shaft 203. Similarly, lubrication oil is circulated to the mating surfaces of the second splined portion 207 through inboard lubrication ports 209, the seals associated with the first set of o-ring glands forcing the lubrication fluid to flow to the second splined portion 207 instead of flowing toward the center of quill shaft 203.

One unique aspect of the configuration of quill shaft 203 in conjunction with spindle gearbox 133 and fixed gearbox 129 is that quill shaft 203 can be removed without removing either of the spindle gearbox 133 and fixed gearbox 129. An access cover 219 can be removed thereby accessing the second splined portion 207 of quill shaft 203. An interior portion 221 includes a feature, such as threads, for which a removal tool 223 can attach thereto. In one embodiment, interior portion 221 has female threads, while removal tool 223 has male threads that mate thereto. Upon attachment of removal tool 223 to quill shaft 203, the quill shaft 203 can be removed by pulling out in an outboard direction along the centerline axis of the quill shaft 203. Quill shaft 203 is critical for the operation of aircraft 101, as such, safety and efficiency of operation is improved by increasing the ease for which quill shaft 203 can be inspected.

The embodiments disclosed herein provide one or more of the following advantages. For example, the location and orientation of proprotor in relation to the wing structure enables the proprotor to be adequately supported with minimal structural mass, while also providing efficient maintainability. Location of the proprotor above the wing allows the proprotor to be removed in an upward direction upon removing the quill shaft, as such, the fixed gearbox and engine don't have to be removed or disassembled when a maintenance action only requires servicing of the proprotor.

Further advantages include a quill shaft located between the fixed gearbox and a rotating spindle gearbox of the proprotor that allows for misalignment between the two. For example, the splined portions of the quill shaft allow for axial translation or floating in relation to the mating features on the fixed gearbox and the spindle gearbox, such as when operation of the tiltrotor causes misalignment in the axial direction of the quill shaft. Further, the splined portions on the quill shaft can be crowned to further allow for non-axial misalignment, such as fore/aft misalignment. Further, quill shaft is configured to be easily removed during a maintenance and/or inspection procedure.

The configuration of propulsion system 111, specifically the easily removable quill shaft 203 between the fixed gearbox 129 and the rotating spindle gearbox 133, lends itself to a unique placement of several different types of torque sensors. The unique placement of the torque sensors is to locate them in a way to measure torque through quill shaft 203.

Conventionally, torque sensors have been used to measure the torque through a mast of an aircraft, such as tiltrotor aircraft 101, or through the engine output shaft. However, both of these methods have significant shortcomings that are solved by relocating the torque sensors to measure torque through quill shaft 203.

One of the disadvantages of measuring torque through the mast of an aircraft is that if the torque sensors on the mast fail, the mast would need to be removed from the aircraft in order to replace the torque sensors. Removing and reinstalling the mast from the aircraft is very expensive and very time consuming. Further, the size and torque of the mast contributes to a high cost for sensor calibration. Since quill shaft 203 is easily removable and comparatively small in size and torque capacity, placing the sensors to measure the torque through quill shaft 203 solves this problem.

Another disadvantage of applying the torque sensors to the mast is that the mast goes into a gearbox. One of the preferred methods of sensing torque through a mast uses magnetic sensors to detect a change in a magnetic field due to torque or a physical change in position between two targets. Since the mast is partially inside a gearbox, it would be possible for metal debris to be attracted to the magnetic sensors or the magnetized portions on the mast. This is unfavorable because the chip detector could be compromised if the metal debris is attracted to the magnetic components instead of the chip detector. Since quill shaft 203 is not located inside a gearbox, locating the torque sensors to measure torque through quill shaft 203 does not have the issue of attracting metal debris from inside the gearboxes.

One of the disadvantages of measuring torque through the engine output shaft of an aircraft, such as tiltrotor aircraft 101, is that it would be necessary that the torque loads required to power the accessories are calculated during operation to most accurately estimate the torque through the mast. The reason why it would be necessary to measure the torque loads required to power the accessories is because the accessories are located downstream from the engine output shafts, but upstream from the mast. There are different types of accessories that can draw power from the system. These accessories can include alternators, lube and scavenge pumps, hydraulic pumps, and generators. In one embodiment, the accessory drives are located in the gear train within fixed gearbox 129 (shown at least in FIG. 13). The torque load absorbed by these accessories would fluctuate significantly, depending on the operation of the aircraft. However, on a system that is limited by mast torque, the data processing system would have to assume that the accessories are running at full capacity and are draining maximum power, all the time. On an aircraft that is limited by mast torque, this assumption would artificially limit the mast torque lower than necessary and reduce overall aircraft performance. In contrast, since quill shaft 203 is located downstream from the accessories, measuring torque through quill shaft 203 is more accurate and provides significant advantages.

Another disadvantage of measuring torque through the engine output shaft is that if one of the engines fail, accurately measuring torque would be difficult. For example, if engine 123 were to fail, engine output shaft 125 would no longer have torque running through it. However, if the torque measuring system were on quill shaft 203, the interconnect drive shaft 131 would transfer torque from the remaining engine, to fixed gearbox 129, then to quill shaft 203. Since the torque measuring system is on quill shaft 203, you would still be able to calculate torque if engine 123 were to fail.

Figure 15:
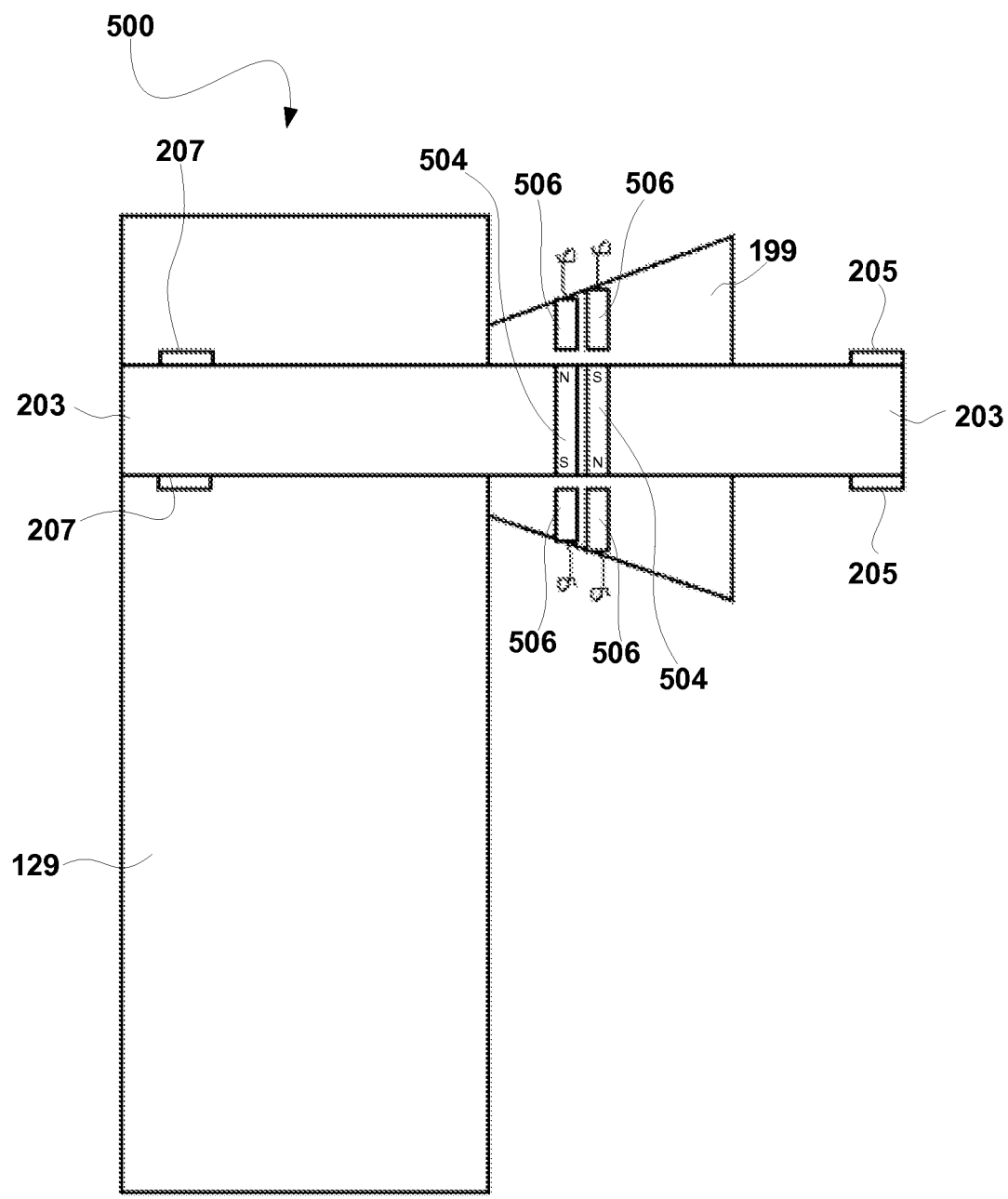
FIG. 15 is a schematic of a torque measuring system according to one example embodiment.

Now referring to FIG. 15, a simplified schematic of one example embodiment of a torque measuring system, magnetic torque sensor system 500, is shown. Magnetic torque sensor system 500 can include any device or devices operable to measure torque through quill shaft 203. For example, magnetic torque sensor system 500 can include magnetoelastically active elements 504 and sensors 506, which are similar to the invention disclosed in U.S. Pat. No. 4,896,544, which is hereby incorporated by reference.

Magnetoelastically active elements 504 can be any objects or materials that experience the Villari Effect. The Villari Effect is the phenomenon that occurs when magnetoelastic materials are distorted or twisted. When magnetoelastic materials are twisted, a change in the direction and strength of the magnetic field occurs. The change in the direction and strength of the magnetic field creates a current and can be detected by transducers, such as sensors 506. The change in the direction and strength of the magnetic field can be used to calculate the torque through quill shaft 203.

Sensors 506 can represent any device that has the capability to detect a magnetic field or current produced by magnetoelastically active elements 504. For example, sensors 506 can be Hall Effect sensors.

Persons of ordinary skill in the art would appreciate that there are several methods of applying magnetoelastically active elements 504 to quill shaft 203. Methods would include, but are not limited to, affixing amorphous ribbons onto quill shaft 203, and plasma spraying or electrodeposition of magnetic metals onto quill shaft 203.

Magnetoelastically active elements 504 can be oppositely polarized and can span the entire circumference of quill shaft 203. Additionally, magnetoelastically active elements 504 can be applied to quill shaft 203 prior to installation and can be placed at a location so that the magnetized portion is within housing 199.

Magnetic torque sensor system 500 can also include two pairs of sensors 506, which can be placed in close proximity to magnetoelastically active elements 504. Sensors 506 may not make physical contact with quill shaft 203, but may be within range to read changes in the magnetic field of magnetoelastically active elements 504. Additionally, the sensors 506 can be placed far enough from quill shaft 203 in order to accommodate for shaft misalignment or small lateral translations of quill shaft 203. Persons of ordinary skill in the art would appreciate that magnetic torque sensor system 500 can be accomplished with one magnetoelastic active element 504 and one sensor 506.

Figure 16:
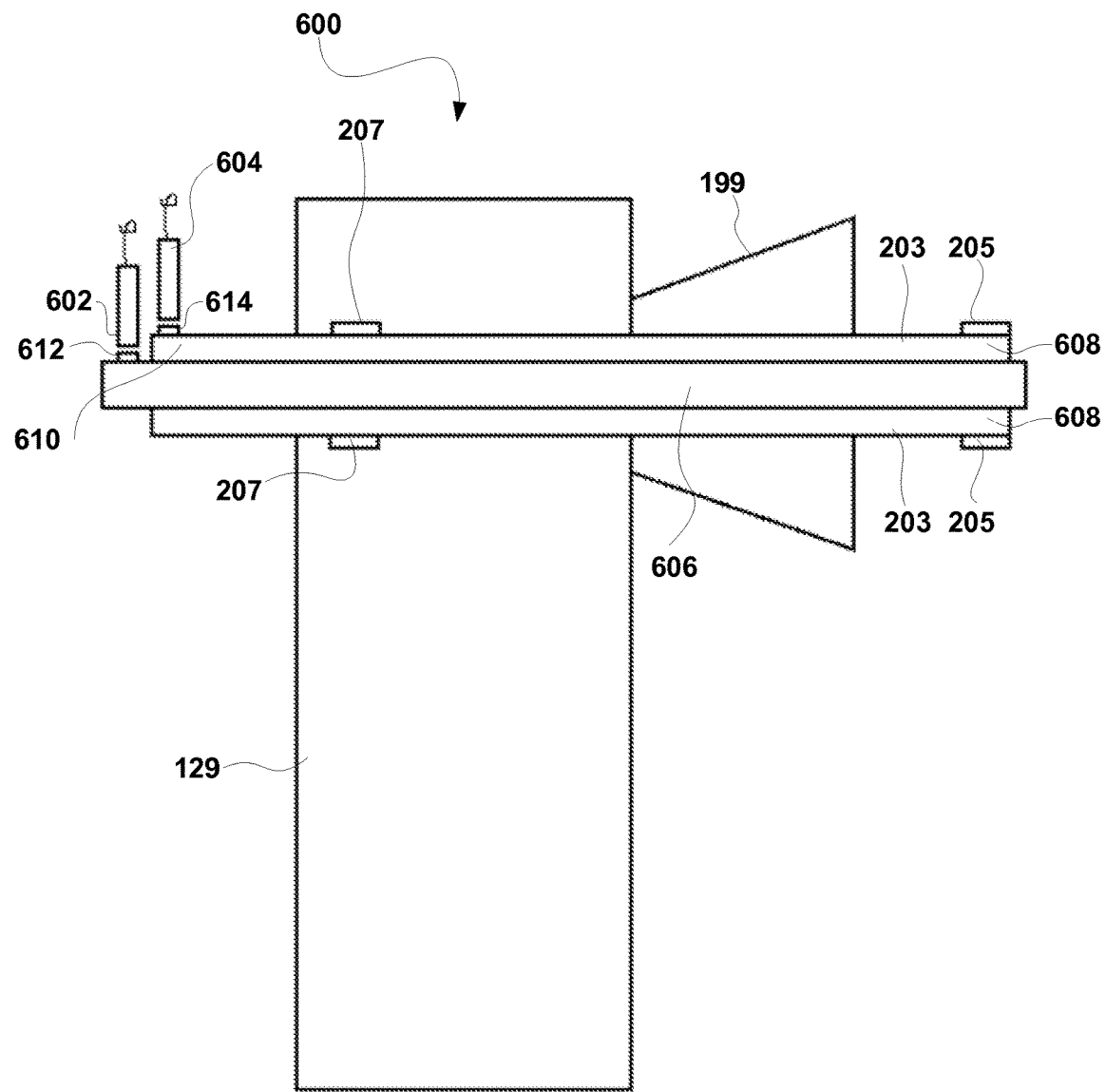
FIG. 16 is a schematic of a torque measuring system according to one example embodiment.

Now referring to FIG. 16, a simplified schematic of another example embodiment of a torque measuring system, a phase shift system 600 is shown. Phase shift system 600 uses a method which is similar to the system and method disclosed in U.S. Pat. No. 8,132,474, which is hereby incorporated by reference. Phase shift system 600 can include stand pipe 606, which can be connected to the first portion 608 of quill shaft 203 in such a way that when quill shaft 203 rotates, stand pipe 606 rotates as well. Any torsional deflection experienced by first portion 608 is also, proportionally, experienced by stand pipe 606. Stand pipe 606 can be coupled to first magnet 612, such that when stand pipe 606 rotates, first magnet 612 rotates at the same velocity as stand pipe 606. This causes first magnet 612 to rotate at the same velocity as stand pipe 606, which rotates at the same velocity as first portion 608 of quill shaft 203. In this manner, first magnet 612 is referenced to first portion 608 of quill shaft 203. A second magnet 614 is coupled to a second portion 610 of quill shaft 203. In this manner, second magnet 614 is referenced to second portion 610 of quill shaft 203. Magnets 612 and 614 can be any object that creates a magnetic field.

In one example embodiment, magnets 612 and 614 can be placed 180 degrees apart from each other on the same plane. As quill shaft 203 and stand pipe 606 rotate, magnets 612 and 614 are rotated past sensors 602 and 604. Sensors 602 and 604 represent any device that has the capability to detect a magnetic field or current produced by magnets 612 and 614. For example, sensors 602 and 604 can be a Hall Effect transducer to sense the magnetic field of each magnet 612 and 614. It should be understood that magnets 612 and 614 do not need to be separated from each other by 180 degrees. Indeed, magnets 612 and 614 can be offset from each other by any desirable amount.

When torque is transferred from the engine to quill shaft 203, the torque causes a torsional twisting of quill shaft 203. Stand pipe 606, being coupled to the first portion 608 of quill shaft 203, follows the rotational twist of first portion 608. This torsional twisting of quill shaft 203 causes a rotational lag between first portion 608 of quill shaft 203 and second portion 610 of quill shaft 203. This rotational lag results in a phase shift between magnets 612 and 614, which is detected by sensor 602. The torque through quill shaft 203 can then be calculated from the phase shift between magnets 612 and 614.

Figure 17:
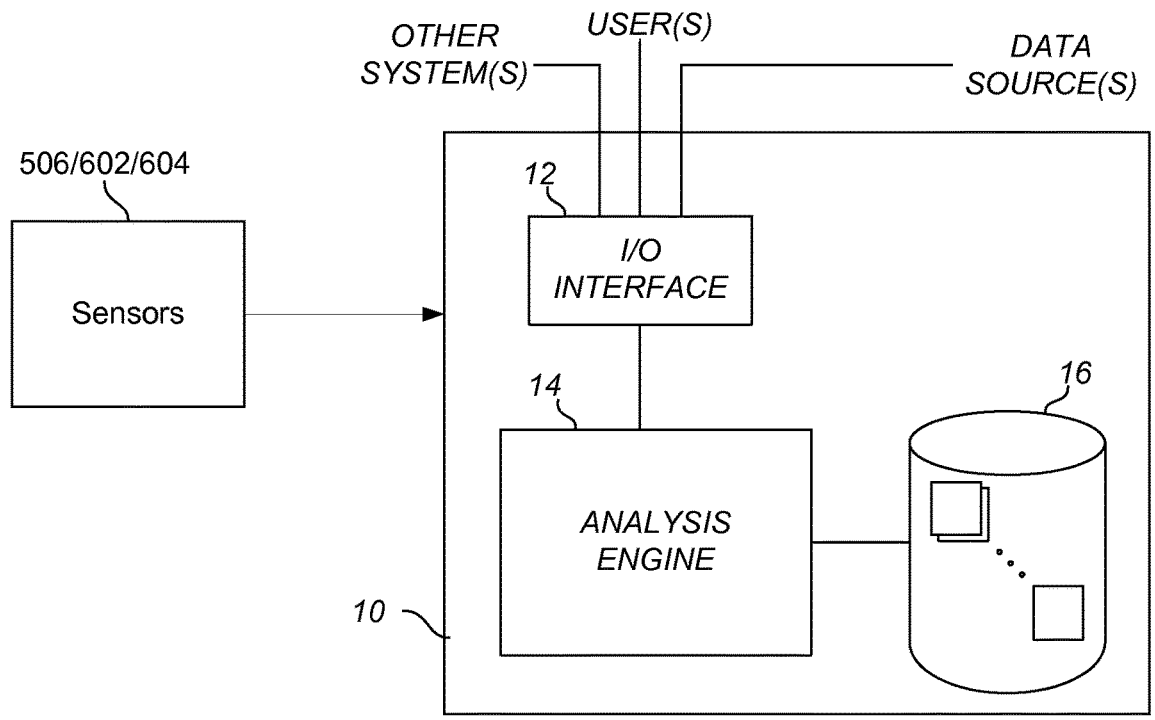
FIG. 17 is a schematic of a computer system according to one example embodiment.

Referring now to FIG. 17, sensors 506 in magnetic torque sensor system 500 or sensors 602 and 604 in phase shift system 600 can be connected to a computer system 10. The computer system 10 may receive input from sensors 506, or sensors 602 and 604, and may calculate the torque in quill shaft 203. The computer system 10 may also calculate the torque in mast 145 by accounting for torque loss from quill shaft 203 to mast 145. Computer system 10 may calculate the torque being applied to mast 145 by compensating for levels of efficiency losses between quill shaft 203 and mast 145. For example, computer system 10 may use a calculated efficiency loss factor or use a table of efficiency loss factors. The calculated efficiency loss factors can be determined by analytical analysis of actual measurement of various parameters which are obtained beforehand.

Computer system 10 can also be configured for performing one or more functions with regard to the operation of magnetic torque sensor system 500 or phase shift system 600. Further, any processing and analysis can be partly or fully performed by computer system 10. Computer system 10 can be partly or fully integrated with other aircraft computer systems.

The system 10 can include an input/output (I/O) interface 12, an analysis engine 14, and a database 16. Alternative embodiments can combine or distribute the input/output (I/O) interface 12, analysis engine 14, and database 16, as desired. Embodiments of the system 10 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 12 can provide a communication link between external users, systems, and data sources and components of the system 10. The I/O interface 12 can be configured for allowing one or more users to input information to the system 10 via any known input device. Examples can include a keyboard, mouse, touch screen, and/or any other desired input device. The I/O interface 12 can be configured for allowing one or more users to receive information output from the system 10 via any known output device. Examples can include a display monitor, a printer, cockpit display, and/or any other desired output device. The I/O interface 12 can be configured for allowing other systems to communicate with the system 10. For example, the I/O interface 12 can allow one or more remote computer(s) to access information, input information, and/or remotely instruct the system 10 to perform one or more of the tasks described herein. The I/O interface 12 can be configured for allowing communication with one or more remote data sources. For example, the I/O interface 12 can allow one or more remote data source(s) to access information, input information, and/or remotely instruct the system 10 to perform one or more of the tasks described herein.

The database 16 provides persistent data storage for system 10. While the term "database" is primarily used, a memory or other suitable data storage arrangement may provide the functionality of the database 16. In alternative embodiments, the database 16 can be integral to or separate from the system 10 and can operate on one or more computers. The database 16 preferably provides non-volatile data storage for any information suitable to support the operation of magnetic torque sensor system 500 and phase shift system 600, including various types of data. The analysis engine 14 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A method of operating a tiltrotor aircraft, the method comprising:
   providing a tiltrotor aircraft comprising at least two propulsion systems and a driveshaft interconnected between the two propulsion systems; each of the propulsion systems comprising:
      an engine disposed at a fixed location relative to a wing member;
      a fixed gearbox;
      a spindle gearbox that is rotatable about a conversion axis;
      a rotor mast rotatably coupled to the spindle gearbox;
      a quill shaft providing torque transfer between the fixed gearbox and the spindle gearbox; and
      a torque measuring system associated with the quill shaft;
   providing a sensor associated with the quill shaft;
   transmitting data from the sensor to the torque measuring system; and determining, by the torque measuring system, a torque value through the quill shaft with data from the sensor.

2. The method according to claim 1, wherein the conversion axis is perpendicular to a rotational axis of the rotor mast.

3. The method according to claim 1, wherein the sensor is configured to measure a magnetic field of an element associated with the quill shaft, wherein the element creates a magnetic field upon a torsional deflection of the quill shaft.

4. The method according to claim 3, wherein the sensor is a transducer.

5. The method according to claim 3, wherein the element is a magnetoelastically active element.

6. The method according to claim 1, further comprising:
referencing a first magnet with a first portion of the quill shaft, the first magnet being configured such that rotation of the first portion of the quill shaft causes similar rotation of the first magnet; and
referencing a second magnet with a second end portion of the quill shaft, the second magnet being configured such that rotation of the second end portion of the quill shaft causes similar rotation of the second magnet.

7. The method according to claim 6, wherein the step of referencing the first magnet with the first portion of the quill shaft is achieved by coupling a first end of a standpipe to the first end portion of the quill shaft and coupling the first magnet to the second end of the standpipe.

8. The method according to claim 1, wherein the torque measuring system comprising:
a computer system configured to determine the torque value through the quill shaft with data from the sensor.

9. The method according to claim 8, wherein the computer system is further configured to calculate the torque through the rotor mast.

10. The method according to claim 8, wherein the computer system is further configured to calculate a torque efficiency loss between the rotor mast and the quill shaft.

11. The method according to claim 1, further comprising:
identifying an efficiency loss value between the quill shaft and the rotor mast; and
using the torque value through the quill shaft and the efficiency loss value between the quill shaft and the rotor mast to determine the torque through the rotor mast;
wherein the determined torque through the rotor mast is used to detect operational loads transmitted through the rotor mast to improve aircraft operation.

* * * * *